(12) United States Patent
da Cruz et al.

(10) Patent No.: US 8,241,391 B2
(45) Date of Patent: Aug. 14, 2012

(54) PROCESS AND EQUIPMENT FOR THE TREATMENT OF LOADS OR RESIDUES OF NON-FERROUS METALS AND THEIR ALLOYS

(75) Inventors: Antonio Carlos da Cruz, Sao Paulo (BR); Oskar Wessel Bender, Sao Paulo (BR)

(73) Assignees: Fundacao de Amparo a Pesquisa do Estado de Sao Paulo-FAPESP, Sao Paulo (BR); Instituto de Pesquisa Technologicas do est, S. Paulo S/A-IPT, Sao Paulo (BR)

( * ) Notice: Subject to any disclaimer, the term of this patent is extended or adjusted under 35 U.S.C. 154(b) by 0 days.

(21) Appl. No.: 13/101,519

(22) Filed: May 5, 2011

(65) Prior Publication Data

US 2011/0203413 A1 Aug. 25, 2011

Related U.S. Application Data

(62) Division of application No. 11/632,192, filed as application No. PCT/BR2005/000129 on Jul. 18, 2005, now Pat. No. 8,009,717.

(30) Foreign Application Priority Data

Jul. 19, 2004 (BR) .................................... 0403000

(51) Int. Cl.
*C22B 7/00* (2006.01)
*C22B 4/08* (2006.01)
(52) U.S. Cl. ..................................... 75/10.19; 75/10.34
(58) Field of Classification Search ................. 75/10.19, 75/10.34
See application file for complete search history.

(56) References Cited

U.S. PATENT DOCUMENTS 5,203,908 A * 4/1993 Lindsay et al. .............. 75/10.35
* cited by examiner

*Primary Examiner* — George Wyszomierski
*Assistant Examiner* — Tima M McGuthry Banks
(74) *Attorney, Agent, or Firm* — Harness, Dickey & Pierce, P.L.C.

(57) ABSTRACT

A process for the treatment of loads or residues of non-ferrous metals and their alloys includes the steps of loading of scraps or dross to be processed and heating the load and melting the metal. The process additionally includes revolving the heated load, tapping the molten metal and emptying a cavity of the furnace. Heating of the load or residues to a temperature above the melting temperature of the metal or non-ferrous alloy to be recovered is carried out by a free burning convective arc which is independent from the supply of external gas to the process, and which may dispense with the use of melting salts.

8 Claims, 7 Drawing Sheets

PROCESS AND EQUIPMENT FOR THE TREATMENT OF LOADS OR RESIDUES OF NON-FERROUS METALS AND THEIR ALLOYS

CROSS-REFERENCE TO RELATED APPLICATIONS

This application is a divisional of U.S. patent application Ser. No. 11/632,192, filed on Dec. 21, 2007 (now U.S. Pat. No. 8,009,717), which is a National Stage of International Application No. PCT/BR2005/000129, filed on Jul. 18, 2005, which claims priority to BRSN PI 0403000-1, filed on Jul. 19, 2004. The entire disclosures of each of the above applications are incorporated herein by reference.

FIELD

The present disclosure, included in the field of metallurgy, relates to the recovery of non-ferrous metals and their alloys present in the corresponding scraps, as well as in drosses generated by industrial processes involving their melting.

BACKGROUND

This section provides background information related to the present disclosure which is not necessarily prior art.

Rotary furnaces are widely used in non-ferrous metal recycling industries for the melting and recovery of pure metal or alloys, as contained in scraps such as empty beverage cans, unusable utensils, laminated profiles, casts, industry chips, waste from production such as cuttings, and also to recover metal contained in drosses generated by industrial processes involving the melting of said metals.

Typically, rotary furnaces operated to recycle non-ferrous metals have a chamber-like metal shell with rotational symmetry to a lengthwise axis, which is internally lined with one or more layers of appropriate refractory material for operation at temperatures above the melting point of the metal. Said chamber is submitted to rotational movement around its lengthwise axis (rotation axis) for tumbling and revolving the material to be processed loaded within it. The furnace rotation axis may or not be inclined with respect to the horizontal plane. No matter which is the way of supplying the energy required to heat and melt the material, the process is carried out in batches, following a processing cycle basically comprising the following steps:

1. Loading the scrap or dross to be processed into the furnace. In case of furnaces heated with oil or gas burners, a protective salt composition is loaded and melted before this step to form a bath in which the material to be processed will be immersed when scraps are treated, or the salt composition will be simultaneously mixed and heated with dross in case of dross treatment.

2. Heating the load and melting the metal to be recovered. During this operating step the furnace is rotationally moved, fully rotating or just oscillating, to revolve the load within it and therefore promoting a better heat transfer between the energy source, the furnace wall and the load.

3. Revolving the load, which may involve or not the addition of extra energy, by rotationally moving the furnace, fully rotating or just oscillating, to promote the coalescence of dispersed fractions of the molten metal, followed by precipitation to a liquid metal bath that forms under a non-metallic solid residue layer along the process.

4. When the separation stage between metal and the non-metal solid fraction is concluded, the molten metal is tapped to outside the furnace, usually into ingot molds.

5. Emptying the furnace cavity by removing the non-metallic solid residue.

Recycling of non-ferrous metals, mainly aluminum, by using furnaces heated by oil or gas burners has the main disadvantage of requiring the addition of melting salts to the load, so to inhibit the oxidation of recoverable free metal and thus to improve the metal yield of the process. The amount of salts used in this case is, in practice, of the same order of magnitude in mass as the quantity of oxides originally contained in the load. Generally, equimolar mixtures of NaCl and KCl are used (eutectic composition). This composition presents a melting point of 667° C., which is compatible with aluminum processing temperatures, and may have fluoride salts added with the purpose of improving salt wettability. Once melted, these salts promote a metal coverage layer that minimizes metal oxidation.

The need of having salts added to improve the metal recovery yield is a disadvantage for processes using oil or gas burners. Heating and melting of salts produce fumes which, besides being pollutant and harmful agents to human health, are also highly corrosive, causing deterioration of the furnace and other industrial equipment and installations used in the process. Another disadvantage of said processes results from the presence of these salts in the non-metal residue as generated after the metal is recovered, also known as salt cake. Without industrial application, these residues are sent to industrial landfills. Besides being expensive, this practice presents environmental risks, since the salts contained in such residues may be easily leached and thus contaminate soils, ground water, rivers and lakes.

The patents CA 1255914 and U.S. Pat. No. 4,959,100, in name of Alcan International Limited, Canada, present a method and device to treat non-ferrous metal dross, particularly aluminum, by making use of a rotary furnace heated by a high temperature gas flame. Said patents claim a process which does not use molten salts and employs a plasma torch with two electrodes, of contained-arc type (plasma gas heaters). Such plasma torch is supplied with a gas stream which, once heated, is introduced into the furnace to promote the melting of the metal contained in the load fed into it. The patent EP 0400925, also in name of Alcan International Limited, Canada, presents a process essentially using the same device as disclosed by the patents CA 1255914 and U.S. Pat. No. 4,959,100, but adapted to melt scraps contaminated with organic material. This process is characterized by removing said contaminants by previously heating the load with the plasma torch, at a temperature below the melting point of the metal, to volatilize the organic material before the load is heated to a higher temperature in order to promote the melting of the metal.

As explained by the patents CA 1255914 and U.S. Pat. No. 4,959,100, plasma torches which may be used to embody the invention as claimed are like the ones manufactured by the company Plasma Energy Corporation, USA. In an article by Alcan International Limited, written by S. Lavoie and J. Lachance, on the recovery of aluminum from primary dross (Five years of industrial experience with the plasma dross treatment process, presented in the Third International Symposium of Recycling of Metals and Engineered Materials, Alabama, USA, Nov. 12-15, 1995), the use of plasma torches manufactured by Westinghouse, USA, type Mark IIIH, is also mentioned. Whatever the manufacturer, said type of plasma torch is described as a device which presents the following characteristics: it is used to heat large amounts of gas as introduced there within and, by its use, supplied to the process to heat the furnace walls and the load itself; for the sake of achieving an efficient heat transfer between gas and load, plasma torch of said construction is a device that depends on the use of diatomic gases, like air and pure nitrogen; it requires stabilizing mechanisms to sustain the arc within it; it depends on means to obtain working life times of electrode which are compatible with the processes to which it is intended to, which is usually reached by feeding the gas as a vortex and/or by using external means to the torch itself, such as external magnetic fields; and requires intense cooling of electrodes which, besides presenting risk of explosion in case water leakage occurs into the furnace, also results in loss of efficiency of the electric energy conversion into thermal energy as contained in the heated gases.

Although the use of plasma as a heating source allows the choice of a wide range of the composition of gases to be used in the process, in case of plasma generation by using plasma torches with two contained electrodes which, as described above, are essentially intended to heat large volumes of gas, for economical reasons in industrial applications involving metal recovery using rotary furnaces, atmospheric air (compressed air) or pure nitrogen are used, as shown by the examples included in the patents CA 1255914 and U.S. Pat. No. 4,959,100. Another reason to choose air or nitrogen in this process, in comparison with the use of inert gases, is that, being diatomic gases, they have considerably higher heat capacity. This is an important characteristic, in this case, in order to promote an efficient energy transfer between the gas which is heated while passing through the plasma torch and the load into the furnace.

The use of air as plasma gas, and consequently as the gas forming the furnace atmosphere, results in the main technical limitation of the process object of the patents CA 1255914 and U.S. Pat. No. 4,959,100, especially in the case of aluminum. Aluminum reacts with oxygen and, more moderately, also with the nitrogen present in air, respectively forming aluminum oxide and aluminum nitride. Both reactions are exothermic, being that the reaction between aluminum and oxygen releases the greatest amount of energy, the two reactions compared. Although the energy released by aluminum oxidation contributes to heat the load, as recognized by Lavoie and Lachance in the above referred article, the added economical value to aluminum as recovered metal does not justify the substitution of electric energy by the energy resulting from metal burning or oxidation. In the mentioned article, Lavoie and Lachance inform that, when the furnace is operated with compressed air, free aluminum oxidation generates about 125 kWh per ton of processed dross. Said quantity of energy, as informed in the article, represents 40 to 50% of the total energy required by the process. A similar situation occurs in an example supplied by the patent U.S. Pat. No. 4,877,448, owned by the company Plasma Energy Corporation, USA. In that example, the use of a plasma torch fed with compressed air results in the oxidation of 4.6% of the recoverable aluminum, generating an additional energy of about 40% of the electric energy as supplied by air heating with the plasma torch. Although the heating method as suggested by the mentioned patents avoids the use of molten salts, one of its disadvantages results from the fact that, for economic industrial use, it depends on the use low cost gases that have high heat capacity, but which unavoidably react with part of the free recoverable aluminum, thus reducing the process metal yield. The use of different gases in different stages of a melting cycle, as also suggested by the patents CA 1255914 and U.S. Pat. No. 4,959,100, makes the furnace operation with this form of heating far more complex. An environmental disadvantage also results from the use of a plasma torch fed with nitrogen, combined with oxygen as present in air or as a pure gas, also recognized by the patents CA 1255914 and U.S. Pat. No. 4,959,100. As previously mentioned, nitrogen reacts with liquid aluminum to form aluminum nitride. Besides causing the loss of recoverable metal, aluminum nitride remains in the solid residues of the process and, while handling or discarding said residue, slowly reacts with water (from air moisture or weathering) to produce ammonia, which is environmentally undesirable.

Patents CA 1255914 and U.S. Pat. No. 4,959,100 also suggest the use of plasma torches of transferred-arc type in their respective processes. However, they do not explain how said arc transference can be made in practice, the technical conditions for said embodiment, nor do they inform the advantages resulting from their use.

Patents CA 2030727 and U.S. Pat. No. 5,245,627, in name of Hydro-Quebec, Canada, claim processes to treat dross containing a metal, bearing in mind its recovery, based on heating the material inside a rotating furnace by a radiating transferred-arc plasma as established between two opposed electrodes, one at each end of the cavity and aligned to the furnace horizontal rotation axis, specifically mentioning the recovery of the metal as contained in primary aluminum dross.

As explained by the patents CA 2030727 and U.S. Pat. No. 5,245,627, both electrodes, preferably manufactured with graphite, may be displaced over the rotation axis of the furnace, both to adjust the length of the electric arc and to compensate for electrode erosion suffered during arc operation. With the purpose of stabilizing the arc at the center of the cavity and along the rotation axis of the furnace, it is suggested the feeding of a gas, still at a low flow rate, through at least one of said electrodes. As also explained in such patents, the main feature of the geometry and way of generating the electric arc between two opposed electrodes is that they promote heating of the furnace walls and the load essentially by means of the radiation issued from the arc, once the furnace is moved around the arc, with a minimum of gas flow, being such a gas fully inert or not to aluminum, but which is introduced into the furnace with the main purpose of stabilizing the radiating arc. Moreover, as explained by the patents CA 2030727 and U.S. Pat. No. 5,245,627, the process is characterized by the radiating arc furnace used to have a rotation axis with which both electrodes are aligned and which remains horizontal when the furnace is in operation.

The use of a radiating electric arc, transferred between two electrodes aligned with the lengthwise or rotation axis of the furnace, positioned over the processed material, as disclosed in the patents CA 2030727 and U.S. Pat. No. 5,245,627, allows to eliminate the disadvantages related to the industrial use under economic conditions of a plasma torch fed with inert gas, as suggested by the patents CA 1255914 and U.S. Pat. No. 4,959,100. In fact, the use of a radiating electric arc allows to use substantially lower flow rates of inert gas, whose purpose is to stabilize the arc within the furnace axis. However, this method has the following disadvantages: risk of breaking the electrodes which, once located along the horizontal rotation axis of the furnace, are prone to shocks with large chunks of material typically found in aluminum dross; the use of two electrodes as suggested does not allow the inclination of the furnace lengthwise axis during operation, which would allow to increase the amount of material which can be fed for a given volume of cavity, but which would increase the risk of contact between one of the electrodes with the processed material, and thus would more easily cause electrodes to be broken.

The creation of means to avoid the formation of hot spots in the material being treated is a common condition observed in the processes making use of both a plasma torch and a radiating electric arc. This fact is particularly mentioned by the patents as filed by Alcan International Limited, CA 1255914 and U.S. Pat. No. 4,959,100. Therefore, the following operational procedure in each of the previously revised processes can be observed: in the equipment that makes use of a two electrodes, contained arc type plasma torch, the high temperature flame must be directed to the side walls of the furnace, away from the load; in the equipment that makes use of a radiating electric arc, this arc is established between two electrodes aligned with the lengthwise rotational axis of the furnace which, once horizontally positioned while in operation, is therefore kept away from the load being treated to avoid its contact with the electrodes and the arc itself.

The present invention has the objective of providing a new process and equipment to recover non-ferrous metals, present in the corresponding scraps, as well as in drosses generated by the industrial processes involving the melting of the metal, involving their melting, particularly of aluminum and its alloys, which allows to eliminate the above mentioned disadvantages.

The following are particular advantages of the present invention: to provide a process which does not make use of melting salts; which is thermally more efficient than the currently known processes, both regarding the use of a more effective way to transfer heat to the load to be processed and the use of an amount of electric energy which is closer to the minimum energy required for the process, i.e. limited to the supply of energy to heat the material up to the processing temperature, only added of the excess energy required to compensate inherent energy losses such as through the furnace walls; and to provide a better use of the internal volume of the furnace, with the increase in loading capacity for a given volume of the furnace cavity.

The technique, apt to process metal scraps as well as drosses which are generated when the metal or alloy is kept in liquid state in the various operations involved in its industrialization, containing the metal or alloy to be recovered, is realized by means of the following process operating steps:

1. introducing the load, constituted by a material containing the metal or metal alloy to be recovered, into the rotary furnace;
2. heating of the material up to a temperature above the melting point of the metal or metal alloy to be recovered;
3. moving the material within the furnace, induced by the rotation or simple oscillation movement of the furnace, during and after the heating step, to separate the molten metal from the non-metallic solid residue;
4. removing the molten metal separated from the non-metallic solid residues; and
5. removing the residual non-metallic solid material.

With no use of melting salts, the invention presents the novelty of the load being heated up to a temperature above the melting point of the metal or non-ferrous alloy to be recovered (step 2). The heating step being accomplished by means of a substantially convective heat exchange, which is independent from the supply of external gas to the process for effects other than the sole control, when desired, of the internal atmosphere of the furnace.

Therefore, the furnace used has the following characteristics: it is constituted by a closed vessel having a revolution axis around which it may be turned or simply submitted to oscillating movement; the construction of the furnace presents the possibility of its revolution axis to rest above the horizontal plane or to be inclined above and below that plane; be preferably heated by means of a free burning convective arc, which is self-stabilized and generated by an electric discharge in continuous current and which, due to the adjustment of the tilting angle ($\alpha$) of the rotation axis of the vessel and the quantity of material fed therein, may be established between one single electrode introduced into the furnace and the load fed therein or the bottom wall of the vessel built of electrically conducting material; preferably, the electrode operates as the cathode in the continuous current electric circuit and is introduced through the furnace door, preferably according to an eccentric or inclined axis with respect to the rotation axis of the furnace, located above it, and which can be displaced alongside its own axis to adjust the length of the arc.

With respect to the polarity of the electrode and its positioning, other possible arrangements may involve the following: electrode operating as the anode in the continuous current electric circuit; electrode operating in alternate current superimposed to a low power, low flow rate pilot flame; positioning the electrode above or below the lengthwise rotation axis of the furnace.

Using only the gas that determines the internal atmosphere of the furnace, a strong gas circulation is induced by mechanisms that are proper of self-stabilized free burning arcs fed under continuous current. According to the invention, such an arc is established between a cathode in the form of a moving electrode introduced into the furnace and an anode preferably formed by the load itself kept in contact with the bottom of the vessel built of electrically conducting material which, on the other hand, is in permanent contact with a fixed external electrode through the steel framework of the furnace.

In other words, the heating process as used does not require the feeding of any external gas, and may work as such or just with minimum flow rate of gas introduced into the cavity of the furnace with the only and sole purpose of providing a given processing atmosphere, as per convenience. Depending on the quantity of material fed in and the inclination of the lengthwise axis of the furnace, the electrically conductive bottom lining may be exposed to the arc which, under this condition, will act as anode.

The heating by predominantly convective heat transfer, caused by gas circulation within the arc, happens more intensely at the contact region between the arc and the anode which, in the present furnace concept, is preferably constituted by the load. This condition results the formation of load regions which are heated above the average bulk temperature of the load, and which are referred to in the literature as hot spots. According to the construction and operating characteristics of the equipment object of the invention, conditions are created for the heated material in these regions to be continually displaced by the action of rotating movement of the furnace, either fully rotating or simply oscillating the vessel, thus providing temperature homogenization by conduction and convection heat transfer in the bulk of the load.

Although other fabricating materials may be used, according to the invention the electrode is preferably made of graphite. The following advantages are pointed out for using this material: the high strength of graphite under high temperatures; no need of using intense cooling means, as a matter of fact it may not be submitted to any kind of cooling at all; long term working life; graphite electrodes are constructively simple and easy to be replaced.

To improve the dissipation of the energy that concentrates in the arc attachment region in the anode, the preferred assembly of the electrode as introduced in the furnace follows an eccentric axis located above the rotation axis of the furnace. In comparison with the assembly of the electrode as aligned with the rotation axis of the furnace, this arrangement has the advantage of producing a relative movement of the load with respect to the region directly reached by the arc blow.

Being the case that the bottom of the vessel acts as anode, as previously stated this condition will depend on the tilting angle of the rotation axis and the amount of load introduced into the furnace, the eccentric assembly of the electrode over the rotation axis, combined with the continuous movement of the vessel, becomes particularly advantageous since it forces the region of the conducting refractory lining directly in contact with the arc blow to draw a circular path whose center lays over the rotation axis of the vessel in case of full turn, or simply an arc-like path in case of simple oscillation. In this case, the region of the bottom refractory strongly heated by convective heat transfer from the hot gases circulating through the arc may be cyclically cooled when it contacts the load at each cycle. At the beginning of the heating cycle this contact occurs mainly with solid material, and at later heating stages with the liquid metal precipitated to the bottom of the vessel. On the other hand, the load is continuously heated by its contact with the hotter bottom region that passes through the arc attachment.

In any condition, whether the anode function is played by the load or the electrically conducting bottom lining, the load's bulk temperature is controlled so not to surpass a specified processing temperature, according to the control of the power dissipated at the electric arc. Concurrent to the fast dissipation of the high energy transferred to the region into direct contact with the arc are both the convective heat transfer in the bulk of the load enhanced by the rotating movement of the vessel, and the high thermal conductivity characteristic of metals.

The physical principles of formation of self-stabilized free burning arcs are reviewed by S. E. Stenkvist and B. Bowman in High-Power, Graphite-Cathode DC Arc Plasma—Properties and Practical Applications for Steelmaking and Ferroalloys Processing in Plasma Technology in Metallurgical Processing, Iron and Steel Society, Inc., 1987, Chapter 8B, pages 103 to 109.

Particularly, the invention takes advantage of the electromagnetic pumping effect caused by the arc contraction which occurs at the interface between the fully developed arc and the cathode material, especially when the tip of the electrode is made sharp as, for example, when it is constructed with a conical geometry.

Concerning the treatment of scraps, a particularly preferred sequence of process operating steps involves keeping a molten metal heel over which one or more loads are effected. Therefore, depending on the apparent density and other characteristics of the material to be processed, step (1) may be repeated after step (3) one or more times, until the amount of load fed in a molten metal tapping cycle reaches a pre-determined value. In the same way, a fraction of the total liquid metal separated from the non-metallic solid residue in a tapping cycle may be kept within the furnace so to more easily promote the heating and melting of metal contained in new loads of material to be processed.

Although clean, previously prepared scraps, substantially lacking organic matter are preferably processed, particularly when dealing with contaminated scraps the repetition of the operating steps as above explained is preferably made onto overheated liquid metal. By moving the vessel to revolve the load, and not establishing the electric arc while the recently introduced load is heated, promotes the cleaning of the load by volatilizing the organics. Once the evolution of fumes ends, the arc is established and load temperature then raised to a specific value above the melting point of the metal or alloy being recovered.

In any loading condition, heating is controlled by knowing the amount of material fed, might it be the case the previous amount of material let into the furnace, monitoring of the power dissipated in the arc by recording the voltage and current of the arc, and monitoring of the temperature by means of thermocouples installed in the rotating vessel, preferably using a data acquisition system coupled to a microcomputer.

With the objective of providing a substantially inert processing atmosphere with respect to the metal to be recovered, particularly during the steps of melting and separation of the metal from non-metallic solid residues, a gas which does not react with the metal, preferably argon gas, may be introduced into the furnace chamber, through an axial hole produced at the center line of the electrode or at any other position of said chamber. In the same way, depending on the processed material, the processing step, and the desired processing effect, other gases may be introduced into the furnace chamber such as nitrogen, hydrogen, methane, carbon monoxide, carbon dioxide, oxygen, air or a mixture of these.

Despite the high temperatures of the gas blown by the arc, either towards the load or the bottom wall of the furnace, the average temperature of the process, which in case of aluminum scraps and dross may situates between 700° C. and 1000° C., is controlled by moderating the power dissipated in the arc, independently controlled by adjusting the current and voltage of the arc as a function of the process temperature, which preferably is continuously measured at the side wall of the furnace.

Once means to control the process atmosphere are provided—for example inhibiting atmospheric air to enter the processing chamber by appropriately sealing the vessel door, or producing a slightly positive internal pressure by feeding an inert gas such as argon in the furnace chamber—, and this atmosphere substantially lacks gases able to react with the metal—such as nitrogen and oxygen in case of aluminum, or volatile substances which may evolve while heating the load—, the establishment of an arc with the load is not a matter of major concern as demonstrated in the description of other processes. On the contrary, according to the invention this resource constitutes an efficient mechanism through which, by simply controlling the intensity of the electric current as imposed to the arc by a power supply, great amounts of heat may be quickly and efficiently transferred directly to the load. As previously explained, both in case of loads with high free metal content, such as scrap, and loads with a considerable quantity of oxides, such as dross, the dissipation of the energy received by the material temporarily placed at the arc attachment region is carried out by continuously rotating or oscillating the vessel.

The invention allows to eliminate problems which are identified both in the processes using the energy released by burning fossil fuels and using plasma gas heaters or radiant electric arc as a way to heat the furnace and load on the purpose of metal recycling.

Concerning the processes in which rotary furnaces are heated by gas or oil burners, the present invention provides a less pollutant process to recover and recycle metals, since the proposed heating source allows the strict control of the process atmosphere and therefore dispenses with the use of melting salts.

Concerning the process that applies a plasma gas heater, the invention provides a process to recover and recycle non-ferrous metals using a rotary furnace that presents the following advantages: (a) considerable reduction in the volume of gas used in the process; (b) the use of lower volumes of gas directly results in the reduction of gaseous effluents which must be treated before being exhausted to the atmosphere; (c) the better control of the atmosphere as provided by the effective use of inert gases, such as argon—or not feeding gases at all—results in lower rates of metal losses by undesirable reactions, such as the reaction between aluminum and nitrogen forming aluminum nitride when using the latter as a plasma gas and, in the same way, by oxidation when using atmospheric air.

Concerning the higher metal yield which may be obtained, it is evident the advantage of using the convective arc as proposed in the present invention when compared with the use of plasma gas heater as the heating method. The heating of the load by convective arc may be quickly and effectively carried out only by using electric energy, without making use of the energy released by burning part of the recoverable metal, as it occurs when the plasma gas heater is operated with air.

Concerning the process in which the remelting furnace is heated with a radiating arc established between two electrodes placed above the rotation axis of the furnace, the invention presents the following advantages: (a) it provides a process to recover and recycle metals using rotary furnaces which is based on a more efficient heat transfer mechanism, since the convective arc principle as used allows to directly transfer heat from the arc to the load; (b) the formation of the convective electric arc using one single electrode positioned above the material to be processed allows to operate the furnace with its rotation axis inclined, with the loading door positioned above the horizontal line, which substantially reduces the risk of breaking the electrode as may be caused otherwise by its occasional contact with the processed material; (c) for a given volume of cavity, the tilting of the furnace rotation axis during operation, positioning the electrode well above the processed material, allows to increase the loading capacity, therefore allowing to increase the production rate without the need of a bigger and therefore more expensive equipment.

The heating of rotary furnaces with fossil fuel burners or plasma gas heater is mainly based on convective heat exchange which, to be effectively carried out, depends on a minimum residence time of the hot gases into the furnace. In practice, this means that a considerable fraction of the volume of the furnace cavity should be kept void, thus limiting the loading capacity the cavity. In case of using an electric arc transferred between two electrodes located at the axis of the furnace and above the load, such as in the case of the process introduced by the patents CA 2030727 and U.S. Pat. No. 5,245,627—whose predominant heat exchange mechanism is arc radiation—, since for operational reasons the furnace must be kept with its lengthwise axis fixed in the horizontal direction while heating and revolving the load into it, an even smaller fraction of the volume of the furnace cavity can be made available to be loaded with material.

In the case of the equipment object of the invention, since the heat transfer is predominantly due to convection and may, in practice, be carried out without introducing any gas into the furnace, there are not limitations either concerning free cavity volume to allow minimum residence times or avoiding the inclination of the rotation axis to prevent breaking of electrodes. Therefore, the invention results in loading capacities which may be substantially higher than previous processes. Mainly concerning materials of high content of free metal, such as in the case of most scraps which are previously prepared, the better occupation of the furnace chamber allows higher production rates over other available heating methods, for a same volume of the furnace chamber.

Despite the partial loss of the revolving effect of the load resulting from further tilting of the lengthwise axis of the furnace above the horizontal direction, the following observations contribute to a better and differentiated performance of the present invention with respect to rotary furnace heating technologies proposed so far: the reduced importance of the effect of revolving as the content of free metal present in the load increases; the fact that the heat transfer occurs directly to the load as the slope of the lengthwise axis of the furnace increases; higher rate of heat transfer, controlled by adjusting the intensity of the arc current, contributing to the quicker formation of a large volume of liquid metal which facilitates both the consolidation of the metal bath as a whole and the quicker and more effective heat transfer within the bulk of the load by liquid phase conduction and convection.

SUMMARY

This section provides a general summary of the disclosure, and is not a comprehensive disclosure of its full scope or all of its features.

The process according to the invention, apt to treat metal scraps as well as drosses containing a metal, such as aluminum, in order to recover this metal, is realized by means of the following process operating steps: introduction of the load, constituted by a material containing the metal or metal alloy to be recovered, into the rotary furnace; heating of the material up to a temperature above the melting point of the metal or metal alloy to be recovered; moving the material within the furnace, induced by the rotation or simple oscillation of the furnace, during and after the heating step, to separate the molten metal from the non-metallic solid residue; removing the liquid metal separated from the non-metallic solid residues; and removing the residual non-metallic solid material.

With no use of melting salts, the invention presents the novelty of the load being heated up to a temperature above the melting point of the metal or non-ferrous alloy to be recovered (step 2) by means of a substantially convective heat exchange, which is independent from the supply of external gas to the process for effects other than the sole control, when desired, of the internal atmosphere of the furnace.

In accordance with the invention, this process is characterized in that the furnace being used comprises a closed vessel having a revolution axis around which it may be turned or simply submitted to oscillating movement; the construction of the furnace presents the possibility of the revolution axis of the vessel to rest over the horizontal plane or to be inclined above and below that plane; be preferably heated by means of a free burning convective arc, which is self-stabilized and generated by an electric discharge in continuous current and which, due to the adjustment of the tilting angle ($\alpha$) of the rotation axis of the vessel and the quantity of material fed therein, may be established between one single electrode introduced into the furnace and the load fed therein or the bottom wall of the vessel built of electrically conducting material; preferably, the electrode operates as the cathode in a the continuous current electric circuit and is introduced through the furnace door, according to an eccentric or sloped axis with respect to the rotation axis of the furnace, located above it, and which can be displaced alongside its own axis to adjust the length of the arc.

In any loading condition, heating is controlled by knowing the amount of material fed, the previous amount of material let into the furnace might it be the case, monitoring of the power dissipated in the arc by recording the voltage and current of the arc, and monitoring of the temperature by means of thermocouples installed in the rotating vessel, preferably using a data acquisition system coupled to a microcomputer.

The invention allows to eliminate problems which are identified both in processes using the energy released by burning fossil fuels as a way to heat the furnace and load, and in processes using plasma gas heaters or radiant electric arc on the purpose of metal recycling.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

A detailed description of the equipment of the "Process and Equipment for the Treatment of Loads or Residues of Non-Ferrous Metals and Their Alloys" is made based on the following figures, which embody the preferred but not limiting elements of the invention:

Corresponding reference numerals indicate corresponding parts throughout the several views of the drawings.

DETAILED DESCRIPTION

Figure 1:
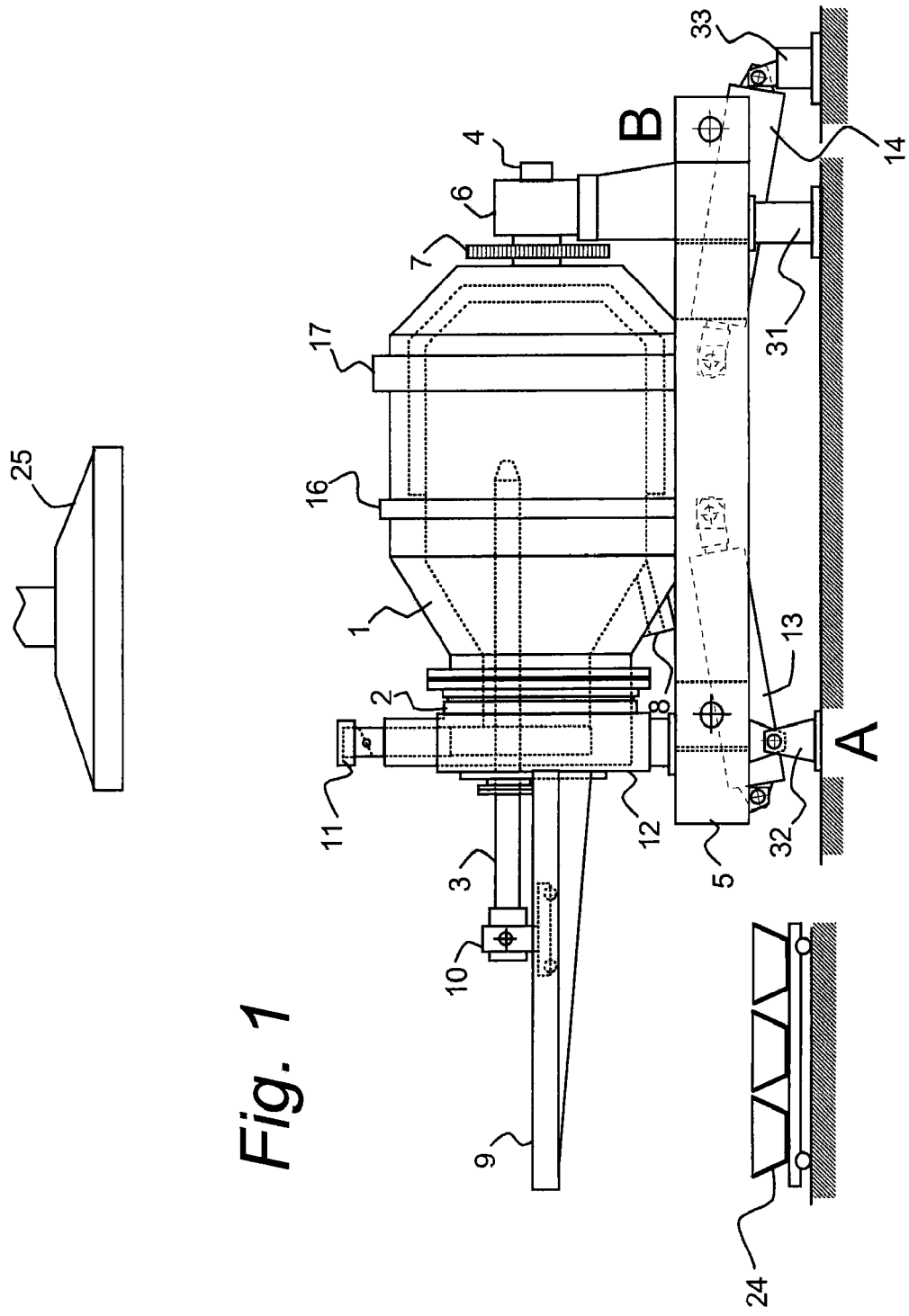
FIG. 1 is an elevation view of a rotary furnaces with its rotation axis placed at the horizontal position.

Example embodiments will now be described more fully with reference to the accompanying drawings.

The following indicative numbering of elements is adopted in the drawings: (1) vessel; (2) door; (3) electrode; (4) flanged axle; (5) support framework; (6) bearing; (7) driving wheel; (8) tapping channel; (9) moving car framework; (10) moving car; (11) exhaustion duct; (12) hinged framework; (13) frontal hydraulic actuator; (14) rear hydraulic actuator; (15) electrically conductive refractory; (16) steel ring, frontal rolling track; (17) steel ring, rear rolling track; (18) refractory material; (19) electrically conductive blocks; (20) fixed electrode; (21) idle rollers; (22) container; (23) residue; (24) ingot molds; (25) gas exhaustion flue; (26) steel shell; (27) chute; (28) furnace cavity; (29) load; (30) valve; (31) support base of the hinged structure; (32) front hinge; (33) end hinge; (34) circular opening; and ($\alpha$) is the tilting angle.

Figure 7:
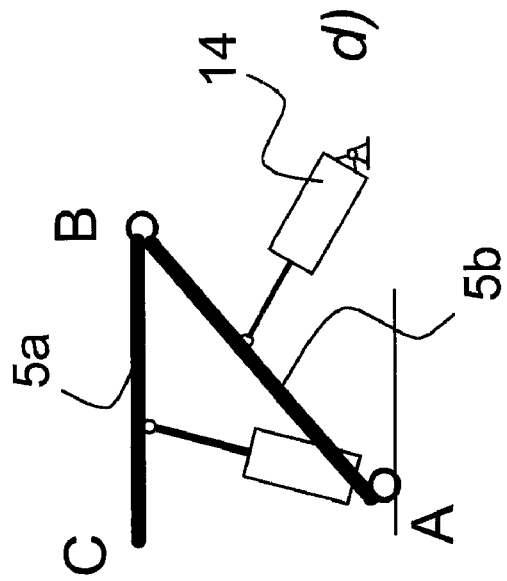
FIG. 7 is a schematic drawing of the possible positions of the framework (5) over which the furnace is supported.
Figure 7:
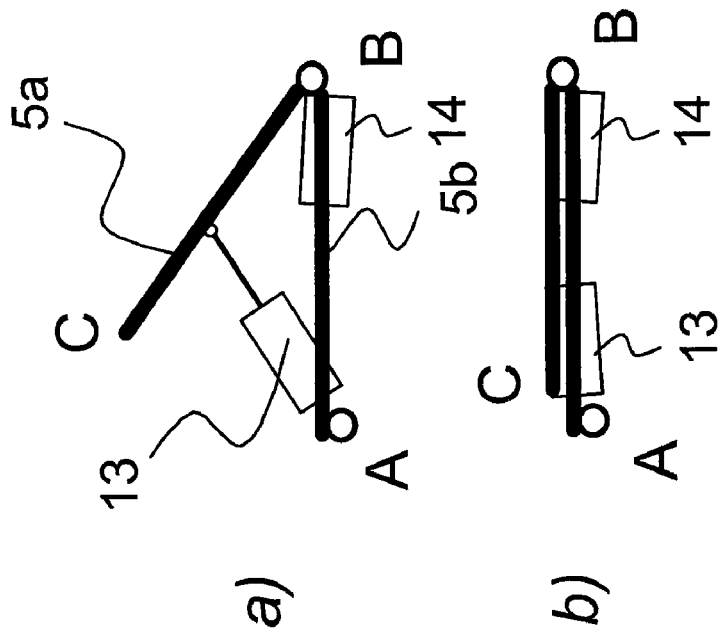
Figure 7:
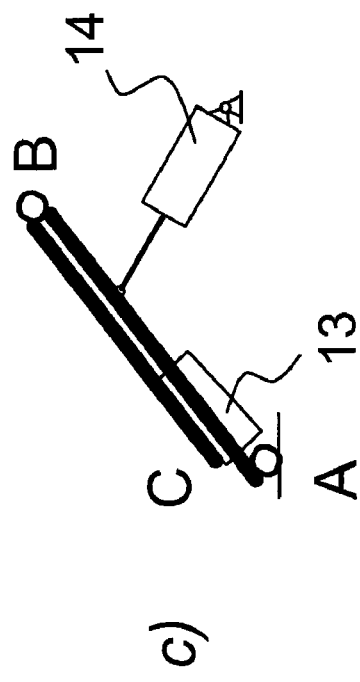

The equipment of the present invention comprises a vessel (1) with a sealed door (2), assembled over a supporting structure schematically represented in FIG. 7, formed by a steel framework (5) with two hinged sections (5a) and (5b) so as to allow the tilting of the vessel's (1) rotation axis in a large angle ($\alpha$) which may vary between $-60$ and $+60$ degrees, and for that the whole set does not need to be substantially risen from the ground level. When resting, with the rotation axis of the vessel horizontally placed and the sections (5a) and (5b) of the structure perfectly fitted within each other, as indicated by FIG. 7(b), such supporting structure assembly allows the lower surface of the vessel to be considerably near the ground level. As shown by FIG. 7(d), the simultaneous movement of the sections of the structure (5a) and (5b) by activating both hydraulic actuators (13) and (14) allows to position the furnace in different angles ($\alpha$) and elevations well above the ground level, which is particularly convenient during the operations of metal tapping and non-metallic solid residue removal from inside the furnace.

Figure 2:
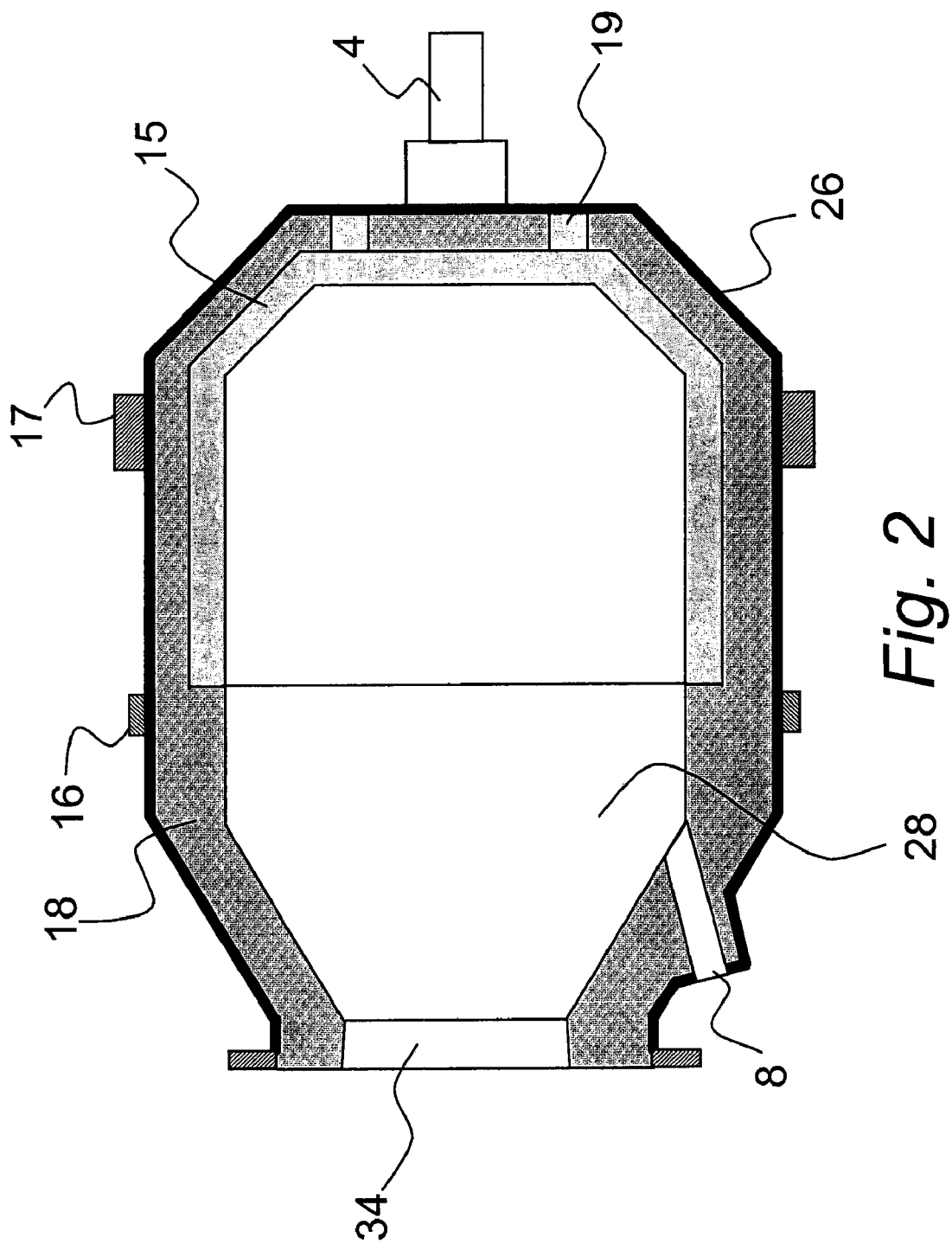
FIG. 2 shows an illustrative section view of a way of embodiment of the vessel (1) appropriate to the realization of the present invention.
Figure 6:
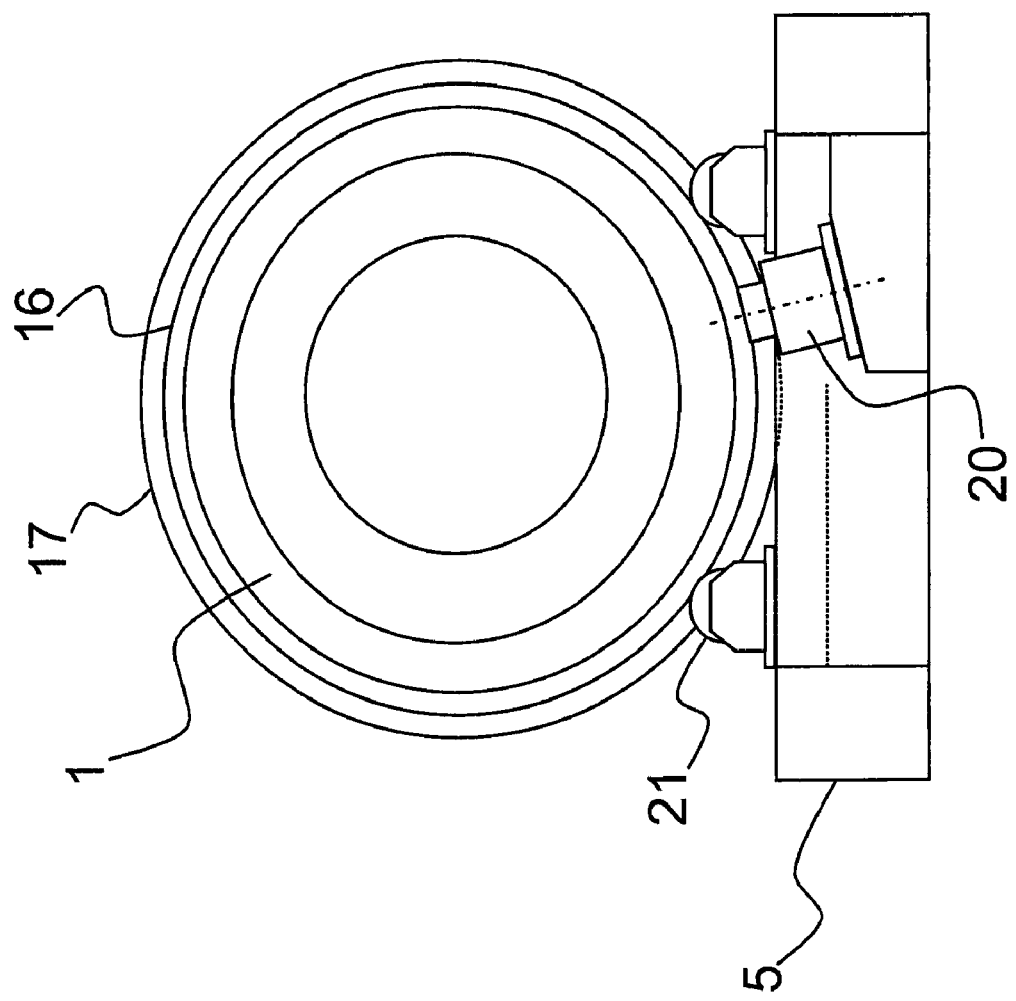
FIG. 6 is a front view of the furnace showing a preferential assembly of the fixed external electrode (20) in contact with the metal framework through the electrical contact steel ring (17)

The vessel (1), as shown by FIG. 2, consists in a steel framework (26) with a circular section, internally lined with refractory material (18) which is compatible with the processed material and process temperatures. The bottom of the vessel (1) is additionally lined with electrically conductive refractory material (15), which is kept in contact with the steel framework (26) by means of electrically conductive blocks (19) and consequently with the fixed external electrode (20) by means of a rolling track or contact steel ring (16), as shown by FIG. 6. Such assembly allows the electric contact of the conductive bottom (15) of the vessel, as well as the perfect grounding of the furnace framework, particularly needed to satisfy operating safety requirements.

The electrically conductive refractory lining of the bottom wall (15) of the vessel (1) may be built in one or more monolithic blocks or by a composition of graphite bricks or a composition obtained by mixing refractory material and carbon in the form of tar or graphite, previously fired or not, or obtained by applying a refractory ramming of appropriate composition, or even constituted by a combination of any of these materials.

The vessel (1) has a lengthwise symmetry axis, or rotation axis, on which the centers of two carbon steel rings (16) and (17) which are fixed to the external side of the steel shell (26) of the vessel and, apart from each other, serve to support the vessel (1) over two pairs of idle rollers (21), being one frontal working set and one back safety set, whose typical assembly is shown by FIG. 6. A flanged axle (4) at the bottom end of the vessel (1) serves to transmit rotating movement to the vessel (1) by means of a driving wheel (7) and to support the vessel (1) over an end bearing (6), as shown in FIG. 1. The rotating or oscillating movement of the vessel (1) is made by a chain or gearing transmission, driven by a power transmission system which may be electric or hydraulic, with provision for continuous adjustment of the rotating speed of the furnace (1) between 0 and 20 rotations per minute and provision to reverse the rotation direction or simply to provide oscillating movement of the vessel (1).

Figure 3:
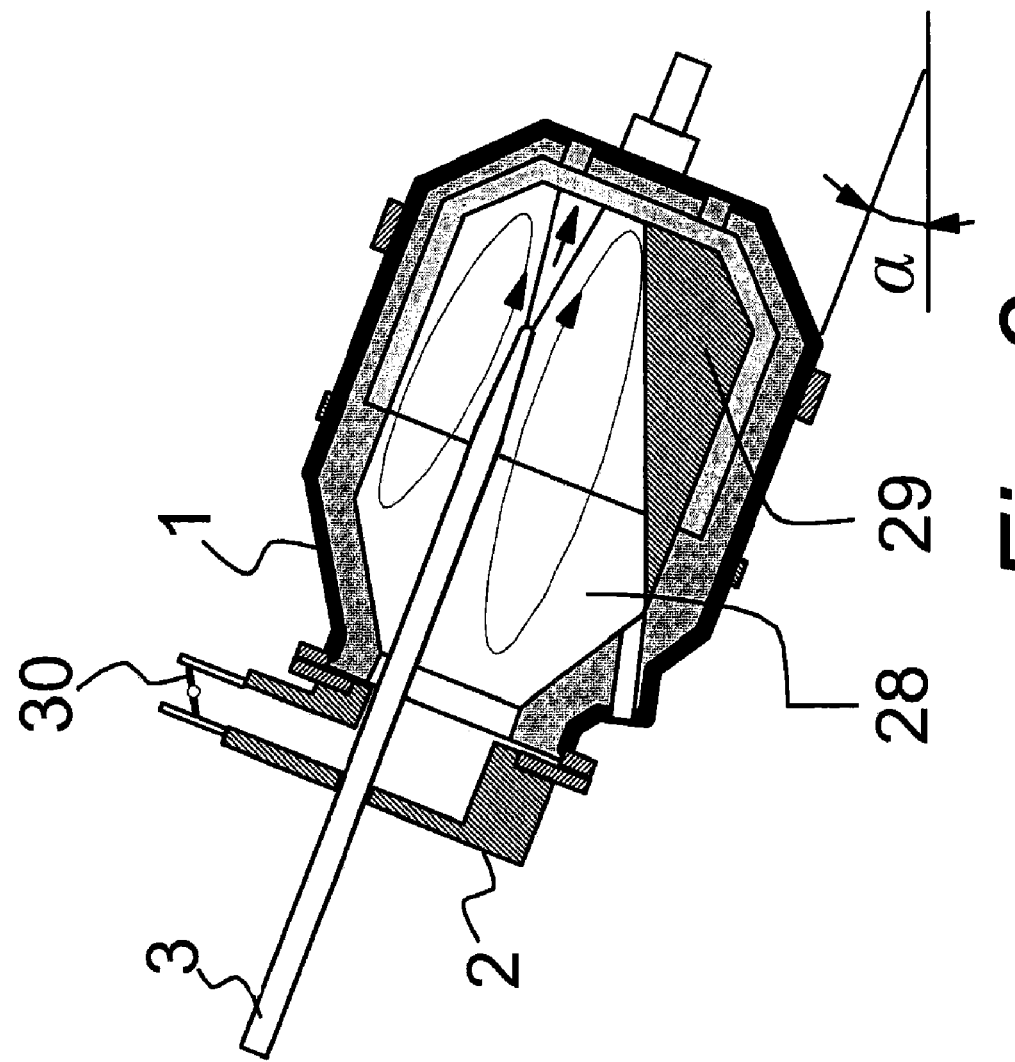
FIG. 3 is an elevation view of a rotary furnaces in operating position with its rotation axis inclined at an angle ($\alpha$) above the horizontal direction, indicating the arc as established between the electrode (3) and the bottom of the vessel (1)

The introduction of material to be processed and the unload of non-metallic solid residue from the furnace are made by means of a the front circular opening (34) of the vessel (1). For liquid metal tapping, the vessel (1) is preferably provided with a tapping channel (8) made through the refractory wall, as it can be seen in FIG. 2. As shown by FIG. 3, the sealed door (2) of this opening, assembled over a hinged framework (12), has an internal cavity which is lined with a thermal isolating material and provided with an opening for gas and volatile material exhaustion at its top. The exhaustion duct (11) is preferably provided with a butterfly-type valve (30) allowing for the adjustment of the internal pressure at slightly positive values even with the injection of small flows of gas into the furnace, when desired. A preferably eccentric hole on the front part of the door (2) allows the electrode (3) to pass through.

Figure 5:
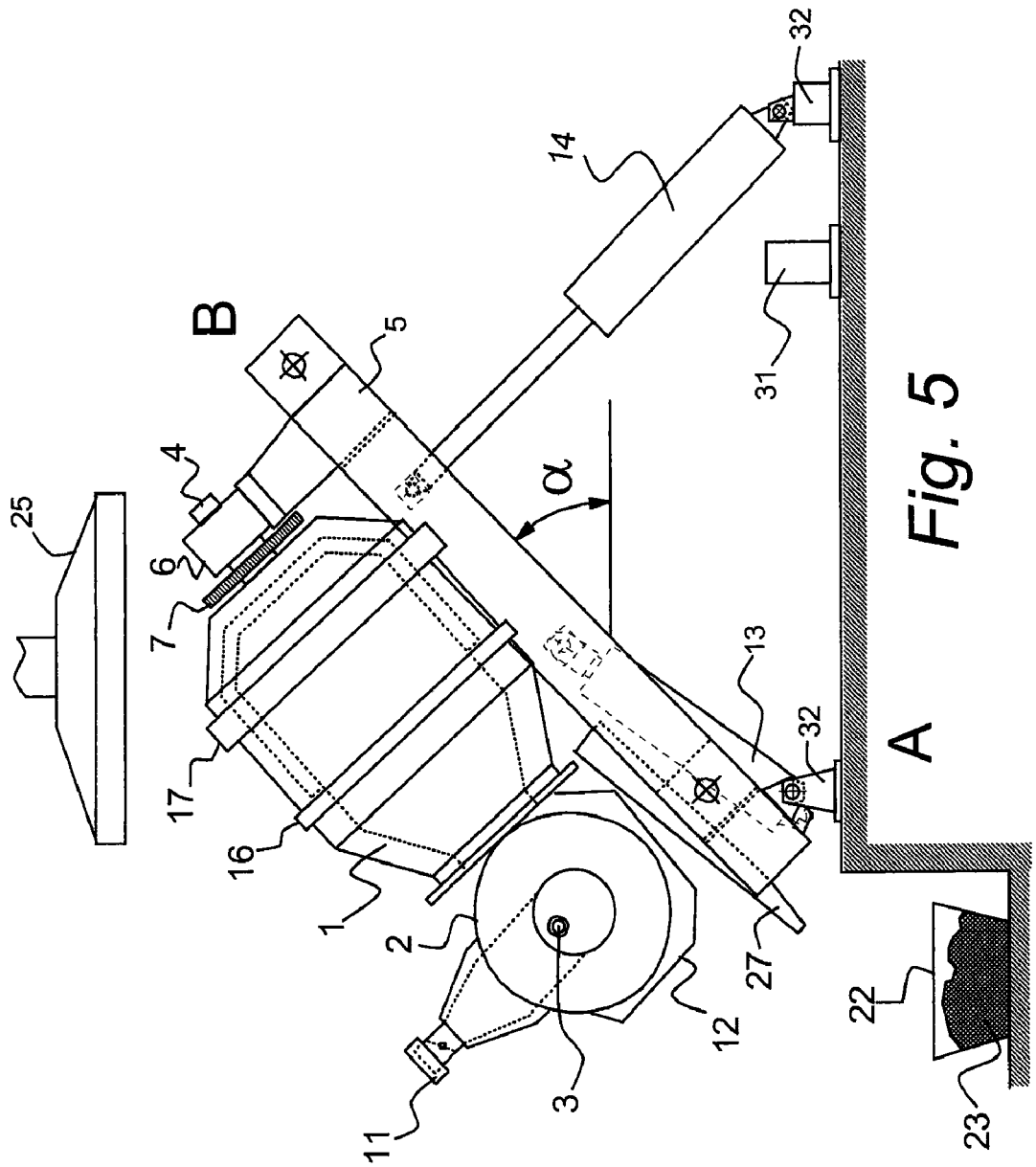
FIG. 5 is an elevation view of a rotary furnaces with its rotation axis inclined below the horizontal direction, with open door (2), in an unloading non-metallic solid residue (23) position.

The small idle rollers (21) and the bearing (6) are mounted on the internal support framework section (5a), which is moved by the hydraulic actuator (13) around the hinging point (B) to elevate the rotation axis of the vessel (1) above the horizontal plane. With the hydraulic actuator (13) pulled back, the advancement of the shaft of the hydraulic actuator (14) promotes the elevation of the whole set around the hinging point (A), promoting the elevation of the bottom of the vessel (1), i.e. positioning the rotation axis of the vessel (1) below the horizontal plane, in a position to unload non-metallic solid residue from inside the vessel (1), as shown in FIG. 5.

Figure 4:
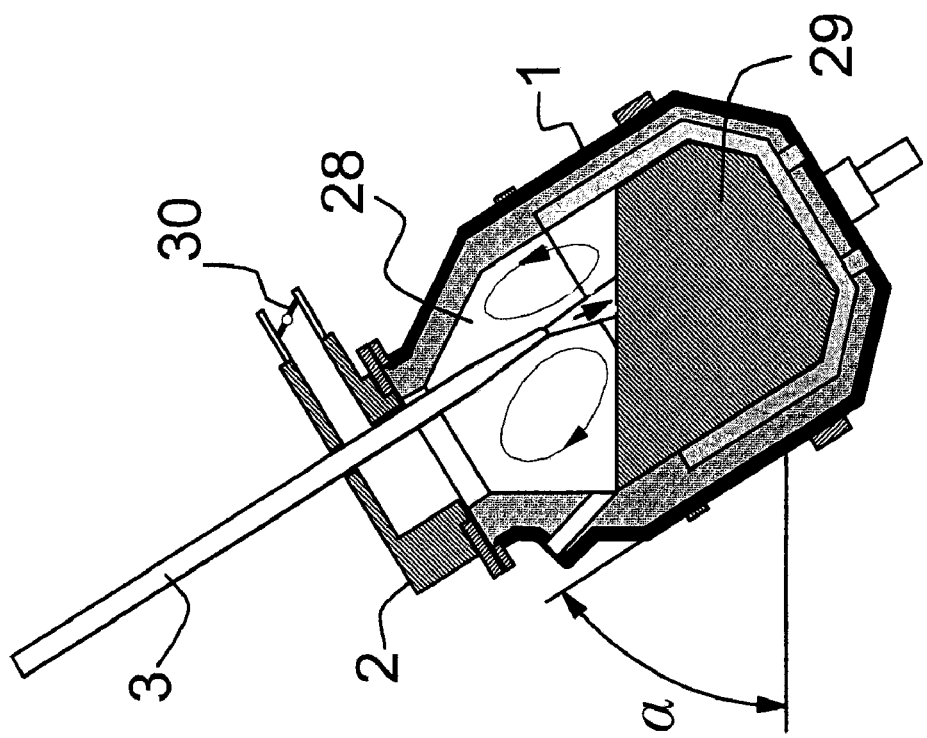
FIG. 4 is an elevation view of a rotary furnaces in operating position with its rotation axis inclined at an angle ($\alpha$) above the horizontal direction, indicating the arc as established between the electrode (3) and the load (29)

For adjustments in small tilting angles ($\alpha$) of the vessel (1) and smaller quantities of load (29) contained inside it, the convective electric arc may be established between the electrode (3) and the electrically conductive bottom (15) as represented in FIG. 3. For adjustments in large tilting angles ($\alpha$) and greater amounts of load (29), the arc may be established between the electrode (3) and the load itself (29), as shown in FIG. 4.

In the schematic drawings indicating the formation of the convective arc (FIGS. 3 and 4), the electrode (3) is positioned along a parallel axis and over the lengthwise rotation axis of the vessel (1). As shown in FIG. 1, the electrode (3) may be moved lengthwise by fixing its external end to the vessel (1) over a moving car (10) guided over a framework (9), which on the other hand is fixed to the framework that supports the door (12). The ways of establishing the convection arc into the furnace cavity include the following alternatives: establishment of the arc between the electrode (3) and the bottom wall of the cavity (15); and between the electrode (3) and the load (29) introduced into the furnace, as it can be seen on FIGS. 3 and 4, respectively.

In a particularly advantageous embodiment of the present invention, the lengthwise axis of the electrode (3) is displaced, in parallel or inclined, with respect to the rotation axis of the vessel (1). As a result of the rotation of the vessel around its lengthwise axis, such assembly allows that, once the arc is directed to the bottom wall of the vessel, which then will work as anode, the contact of the arc to draw a circular path whose center lays on the rotation axis of the vessel (or in the form of an arc, if the movement of the vessel does not occur as a full turn). This action brings the heated portion of the bottom wall to cyclically enter into contact with the load and allowing it to more easily dissipate the intense heat transferred to it by the action of the convective arc.

A perforated hole along the lengthwise axis of the electrode (3) allows to introduce gas with the purpose of purging the inside atmosphere of the furnace cavity, thus providing a substantially non-reactive atmosphere.

The furnace (1) may be previously heated by the combustion of fossil fuel or preferably by the arc itself transferred from the electrode (3) to a load made of charcoal or the processed material itself. The initial load, made of charcoal or the material to be processed, is intended to protect the electrically conductive bottom lining (15) of the vessel. In case charcoal is used as the starting load, once the heating is completed to a temperature close the operating temperature, it may or not be removed before the first load of material to be processed is effected.

The process starts with the introduction of material to be treated into the furnace cavity. Depending on its nature, the material may or not be submitted to a heating period by simple heat exchange with the furnace walls without using the electric arc, and with the furnace kept in rotation or simply in oscillating movement. This practice applies to loads presenting some moisture and/or content of organic material, and has the purpose to promote its removal by heating and volatilization before the electric arc may be established, thus avoiding undesired high temperature reactions which may consume recoverable metal. Following, the material is heated by direct application of the convective electric arc, fed in voltage and current from a power supply, until a given amount of energy is added, compatible with the temperature of the process, when the arc may be extinguished and the movement of the vessel may be kept for the load to continue to be revolved temperature homogenization and conclusion of the separation between liquid and solid phases. No matter whether a heating step to eliminate volatile materials is applied, except for the moment of establishing the arc by approximation of the electrode until it finds the load, the furnace is always kept in a continuous rotation or simply oscillating movement, in a rotation speed which may vary between 0 and 20 rotations per minute. Once this step is concluded, which lasts for a period defined by the processing practice of each material, the tapping of the liquid metal proceeds to inside ingot molds (24) or alternatively to inside a ladle for liquid metal transference, as shown in FIG. 1. Especially in case of scrap treatment, depending on the content of metal therein and/or if there is low formation of non-metallic solid residues, part of the material may be left into the furnace to receive material from a new load. When a reasonable amount of non-metallic solid residue forms into the cavity, in one single or multiple loading cycles, once the recovered metal is tapped, the residue is poured into a container by tilting the furnace axis below the horizontal line. For this operation, a special chute (27) may be used to conduct the residue (23) to within the container (22), as shown in FIG. 5.

Accordingly, in case of low density loads, multiple loadings within one single cycle may be required until the maximum loading capacity of the furnace is reached. In this case, the tilting angle ($\alpha$) of the furnace may be progressively increased above the horizontal line, as new loads continue to be added.

Although the invention has been particularly disclosed and exemplified in this description, it will be clear for the skilled in the art that variations and changes may be obtained, not however escaping from the scope of the invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A process for the treatment of loads or residues of non-ferrous metals and their alloys comprising:
   loading scraps or dross to be processed into a furnace, heating the load and melting the metal;

revolving the heated load;

removing the molten metal and emptying the furnace, wherein the heating of load or residues up to a temperature above the melting temperature of a metal or non-ferrous alloy to be recovered is made by means of a free burning convective electric arc;

wherein contaminated residues or loads containing organic material are processed without establishing the convective arc while the load is heated with a simultaneous formation and elimination of volatiles.

2. The process for the treatment of loads or residues of non-ferrous metals and their alloys according to claim 1, further comprising maintaining an inert environment independent of a supply of external gas to the process.

3. The process for the treatment of loads or residues of non-ferrous metals and their alloys according to claim 1, wherein the process excludes the use of salts.

4. The process for the treatment of loads or residues of non-ferrous metals and their alloys according to claim 1, further comprising generating the free burning convective arc by continuous current electric discharge, the free burning convection arc being self-stabilized.

5. The process for the treatment of loads or residues of non-ferrous metals and their alloys according to claim 4, wherein the arc is established between a single electrode introduced into the furnace and the load fed to it, or a bottom wall of a vessel built of electrically conductive material.

6. The process for the treatment of loads or residues of non-ferrous metals and their alloys according to claim 1, wherein an electrode operates as a cathode and further comprising displacing the electrode along its axis to adjust a length of the arc.

7. The process for the treatment of loads or residues of non-ferrous metals and their alloys according to claim 1, wherein an anode is constituted by the load or dross fed in, or a bottom wall of a vessel built of electrically conductive material.

8. The process for the treatment of loads or residues of non-ferrous metals and their alloys according to claim 1, further comprising introducing gases into a furnace chamber during an initial formation or recovery of the furnace atmosphere, depending on a processed material, such gases selected from a group consisting of noble gases, nitrogen, hydrogen, methane, carbon monoxide, carbon dioxide, oxygen, air and mixtures thereof.

* * * * *